United States Patent
Long et al.

[15] 3,674,776
[45] July 4, 1972

[54] P-HYDROXYAMPICILLIN AND SALTS THEREOF

[72] Inventors: Anthony Alfred Walter Long, Reigate, Surrey; John Herbert Charles Nayler, Dorking, Surrey, both of England

[73] Assignee: Beecham Group Limited, Brentford, Middlesex, England

[22] Filed: Aug. 18, 1969

[21] Appl. No.: 851,062

[30] Foreign Application Priority Data

Aug. 23, 1968 Great Britain......................40,319/68

[52] U.S. Cl.............................................260/239.1, 424/271
[51] Int. Cl. .........................................................C07d 99/16
[58] Field of Search...............................................260/239.1

[56] References Cited

UNITED STATES PATENTS 3,192,198   6/1965   Naylor et al. ........................260/239.1

OTHER PUBLICATIONS

The Merck Index pages 778–779 (1960)
The Merck Index pages 75 and 791 (1970)

*Primary Examiner*—Nicholas S. Rizzo
*Attorney*—Jacobs & Jacobs

[57] ABSTRACT

Derivatives of 6-Aminopenicillanic Acid possessing antibacterial activity are disclosed.

5 Claims, No Drawings

P-HYDROXYAMPICILLIN AND SALTS THEREOF

This invention relates to penicillins and is a development of the invention of our U.S. Pat. No. 3,192,198.

In our U.S. Pat. No. 3192198 we have described and claimed the class of α-amino-α-(hydroxyphenyl) methylpenicillins having the general formula:

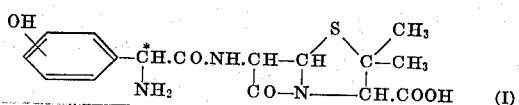

and their non-toxic salts. This class of compounds includes three structural isomers, the hydroxy substituent being ortho, meta or para. The existence of an asymmetric carbon atom (marked by the asterisk) in the side chain indicates that each of the three hydroxy-substituted compounds can exist in two optically active isomeric forms. These isomeric forms are epimers and not enantiomorphs in view of the fact that the 6-aminopenicillanic acid used in the synthesis is itself an optically active compound. Thus U.S. Pat. No. 3,912,198 embraces six different penicillins, but these are actually described only as three pairs of epimers and not as individual compounds.

It was disclosed in our U.S. Pat. No. 3,192,198 that two of the epimeric pairs, those in which the hydroxy substituent was meta or para, have the advantage of particularly good activity against Gram-negative bacteria.

In particular they were more active than the standard broad-spectrum penicillin, the D(−)-epimer of α-aminobenzyl penicillin, ampicillin, when tested against *Salmonella typhimurium* and *Klebsiella pneumoniae* in mice.

The individual epimers of the m- and p-hydroxy compounds were prepared from α-amino-m-hydroxy-phenylacetic acid and α-amino-p-hydroxyphenylacetic acid resolved into their optical antipodes and coupled with 6-aminopenicillanic acid by general procedures described in U.S. Pat. No. 3,192,198. The four resulting hydroxypenicillins were then submitted to in vitro antibacterial screening in comparison with the two epimers of α-aminobenzylpenicillin. Results against five Gram-negative bacteria are summarized in Table 1.

TABLE 1

| Ring substituent | Rotation of side-chain amino acid | M.I.C. (μg./ml.) | | | | |
|---|---|---|---|---|---|---|
| | | E. coli | Proteus mirabilis | Salm. typhi | Shigella flexneri | Kleb. pneum |
| None | − | 5 | 1.25 | 0.6 | 12.5 | 2.5 |
| Do | + | 12.5 | | 2.5 | | 5 |
| mOH | + | 25 | 25 | 12.5 | 25 | 12.5 |
| mOH | − | 5 | 2.5 | 1.25 | 2.5 | 1.25 |
| pOH | − | 5 | 1.25 | 1.25 | 2.5 | 1.25 |
| pOH | + | 25 | 12.5 | 12.5 | 12.5 | |

The table shows that the penicillins derived from the (−) isomers of the side-chain acids are uniformly more active than those derived from the (+) isomers, the difference in activity of the epimers being more pronounced for the hydroxy compounds than for the previously known epimers of α-aminobenzylpenicillin. It was concluded that of the six penicillins covered by U.S. Pat. No. 3,192,198 the two most active are the (−) epimers of the m- and p-hydroxy substituted compounds. Extensive animal tests showed that, like the great majority of penicillins, these epimers were virtually non-toxic.

The two penicillins were then compared with ampicillin in absorption studies in human volunteers. Groups of fasting volunteers were each given 500 mg. of the appropriate penicillin by mouth in capsules, and blood samples were withdrawn at regular intervals and assayed biologically to determine the serum concentration of the penicillins. The urine was also collected over a 6 hour period and similarly assayed to determine the proportion of the dose excreted via the kidneys. Average values are listed in Table 2, A being the (−) isomer of the m-hydroxy compound and B the (−) epimer of the p-hydroxy compound:

TABLE 2

| Penicillin | No. of subjects | Average serum concentration (μg./ml.) after— | | | | | Percent excreted in urine (0-6 hr) |
|---|---|---|---|---|---|---|---|
| | | ½ hr. | 1 hr. | 2 hr. | 4 hr. | 6 hr. | |
| Ampicillin | 22 | 1.29 | 3.12 | 4.06 | 1.16 | 0.38 | 42 |
| A | 8 | 0.91 | 2.50 | 2.86 | 1.15 | 0.44 | 31 |
| B | 20 | 2.9 | 8.25 | 10.75 | 3.1 | 1.13 | 74.5 |

The results show that the blood levels of the (−) m-hydroxy derivative after oral administration are rather lower than those produced by a similar dose of ampicillin. On the other hand the blood levels found with the (−) p-hydroxy derivative are more than twice as great as those given by ampicillin, and some three times as great as those given by the (−) m derivative. The concentrations found in the urine are entirely consistent with these conclusions. With ampicillin and the (−) m derivative considerably less than half of the dose is accounted for in the urine, but with the (−) p-hydroxy derivative the high proportion of 74.5 percent is accounted for in this way. This means that at least three-quarters of the (−) p-hydroxy derivative taken by mouth must have been absorbed into the bloodstream.

It is quite unexpected that the introduction of the p-hydroxy substituent should substantially increase the oral absorption of ampicillin, particularly since the same substituent in the m position slightly reduces absorption. Various examples are known in other series of penicillins where the introduction of substituents into the side-chain increases oral absorption, but these depend on an increase in lipid/water partition coefficient which facilitates diffusion of the antibiotic through the lipid membrane in the wall of the stomach or intestine. Thus in the α-phenoxy-alkylpenicillins absorption increases with increasing size of the α-hydrocarbon substituent (Ph> Et>Me> H). Similarly, in the isoxazolyl series, dicloxacillin is better absorbed than cloxacillin, which in turn is better absorbed than oxacillin. However, hydrocarbon groups and halogen atoms are well-known examples of lipophilic (i.e., hydrophobic substituents, whereas the hydroxy group is hydrophilic. No previous example of penicillins with comparable acid-stability where the introduction of hydroxyl or any other hydrophilic group into the side-chain has enhanced oral absorption is known.

The combination of high antibacterial activity and high oral absorption in man gives the (−) epimer of the p-hydroxy compound, herein called 6[(−)α-amino-p-hydroxyphenylacetamido]- penicillanic acid, a unique advantage over the other five isomers embraced in U.S. Pat. No. 3,192,198 as well as over all other broad-spectrum penicillins.

Accordingly, the present invention comprises 6-[(−)α-amino-p-hydroxyphenylacetamido]penicillanic acid and non-toxic salts thereof.

The present invention also provides a process for the preparation of 6[(−)α-amino-p-hydroxyphenylacetamido]-penicillanic acid and non-toxic salts thereof, which process comprise reacting 6-aminopenicillanic acid or a salt thereof with a functional derivative of the (−) isomer of a carboxylic acid of the general formula:

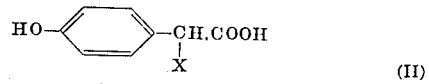

where X represents an amino group, a protected amino group or a group which is subsequently converted into an amino group.

If desired the phenolic hydroxy group may also be protected during the acylation step, e.g., as an O-benzyl or O-benzyloxycarbonyl group which is subsequently removed, but generally the protection of this group is not essential.

Examples of protected amino groups include the protonated amino group ($X = NH_3^+$) which after the coupling reaction reverts to $NH_2$ on simple neutralization, the benzyloxycarbonylamino group ($X = NH·CO_2·CH_2·Ph$) or substituted benzyloxycarbonylamino groups which are subsequently converted to $NH_2$ by catalytic hydrogenation, and various groups which after coupling regenerate the amino group on mild acid or alkaline hydrolysis.

Examples of the group X which may be subsequently be converted into NH$_2$ by mild acid hydrolysis include enamine groups of general formula (III) or tautomeric modifications thereof, and o-hydroxyarylidene groups of general formula (IV) or tautomeric modifications thereof.

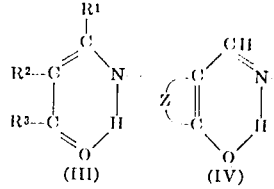

In structures (III and IV) the dotted lines represent hydrogen bonds. In structure (III) R$^1$ is a lower alkyl group, R$^2$ is either a hydrogen atom or together with R$^1$ completes a carbocyclic ring, and R$^3$ is a lower alkyl, aryl, or lower alkoxy group. In structure (IV) Z represents the residue of a substituted or unsubstituted benzene or naphthalene ring. Examples of the group X which may subsequently be converted into NH$_2$ by mild alkaline hydrolysis include 2-sulphonyl substituted ethoxycarbonylamino groups R·SO$_2$·CH$_2$·CH$_2$·O·CO·NH—, wherein R represents a substituted or unsubstituted alkyl, aralkyl, or aryl group.

Another example of a group X which can be converted into NH$_2$ after coupling of the acid (II) with 6-aminopenicillanic acid is the azido group. In this case the final conversion into NH$_2$ may be brought about either by catalytic hydrogenation or by electrolytic reduction.

In carrying out the coupling of the acid (II) to 6-aminopenicillanic acid the choice of activating group for the carboxyl function will be influenced by the chemical nature of the α-substituent X. Thus, when X is an acid-stable group, such as the protonated amino group NH$_3^+$ or the azido group, it is often convenient to convert the acid (II) into an acid halide, for example by treating it with thionyl chloride or phosphorus pentachloride to give the acid chloride. Such reagents would however be avoided when X is an acid labile group of type (III) or (IV), in which case it is often convenient to make use of a mixed anhydride. For this purpose particularly convenient mixed anhydrides are the alkoxyformic anhydrides, which are conveniently prepared by treating an alkali metal or tertiary amine salt of the acid (II) with the appropriate alkyl chloroformate in an anhydrous medium at or below room temperature. Other ways of activating the carboxyl group include reaction with a carbodiimide to give a reactive O-acyl isourea or reaction with carbonyldiimidazole to give a reactive imidazolide. These latter derivatives, like the mixed anhydrides, are relatively unstable substances and hence are not usually isolated, the reaction with 6-aminopenicillanic acid being carried out in situ.

Another reactive derivative of α-amino-p-hydroxy-phenylacetic acid useful in the preparation of the compound of the present invention is the Leuch's anhydride. In this structure the group which activates the carboxyl group also serves to protect the amino group.

The compound of the present invention may be isolated in any of the ways customarily employed for the isolation of aminopenicillins. Thus it may be obtained as the neutral molecule, although this is probably more accurately represented as the zwitterion, or it may be isolated as a salt. Since the molecule contains both basic and acidic functions the salts are of two kinds. The acid addition salts, some of which are sparingly soluble in water and thus useful for isolation purposes, include salts with mineral acids such as hydrochloric, phosphoric, or thiocyanic acid as well as with strong organic acids such as naphthalene-β-sulphonic acid. The base addition salts include alkali and alkaline earth metal salts, the ammonium salt, and salts with non-toxic amines. Any of these forms may be either anhydrous or hydrated. They may also be either amorphous or crystalline, but the crystalline forms are preferred since they have greater stability.

At any suitable stage in the process the material may be subjected to purification procedures designed to remove traces of high molecular weight allergenic impurities.

The penicillins of the present invention may be employed in admixture with suitable pharmaceutical carriers in various medicinal dosage forms. Additionally, the penicillins may be employed in synergistic combinations with known penicillanase-resistant penicillins, for example, methicillin, cloxacillin, dicloxacillin, flucloxacillin and nafcillin.

The following examples illustrate the present invention:

EXAMPLE 1

Resolution of α-Benzyloxycarbonylamino-p-hydroxyphenylacetic Acid

A solution of the title acid (224 g.) and quinine trihydrate (285 g.) in boiling ethanol (2.5 l.) was allowed to cool. The crystals which separated were collected and recrystallized twice from ethanol to give a 76 percent yield of the quinine salt of the laevorotatory acid, $[\alpha]_D^{20}$ —158.5° (C, 1 in MeOH). Treatment of the quinine salt (68 g.) with dilute sodium hydroxide, removal of quinine by ether-extraction, and acidification of the aqueous solution gave the laevorotatory acid. This was crystallized twice from aqueous ethanol to give 28 g. (85 percent) of (—)α-benzyloxycarbonylamino-p-hydroxyphenyl-acetic acid, m.p. 159°–161°, $[\alpha]_D^{18}$ - 120.0° (C, 1 in MeOH). (Found: C, 64.1; H, 5.2; N,4.7. C$_{24}$H$_{21}$NO$_7$ requires C, 63.9; H, 4.9: N, 4.7%).

The mother liquor from the crude quinine salt was evaporated to dryness in vacuo to leave a syrup, which was treated with aqueous sodium hydroxide and the quinine removed by ether-extraction. Acidification of the aqueous layer gave the crude dextrorotatory acid (108 g.) which was collected, dried, and treated with ephedrine (63 g.) in boiling ethanol (450 ml.). On cooling the solution the ephedrine salt of the dextrorotatory acid separated, and was collected and recrystallized from ethanol. Yield 111 g., $[\alpha]_D^{21}$ +46.8° (C, 1 in H$_2$O). The acid was recovered from this salt in the usual way to give (+)α-benzyloxycarbonylamino-p-hydroxphenylacetic acid (96 percent) which, after re-crystallization from 50 percent aqueous ethanol, had m.p. 158°–161°, $[\alpha]_D^{21}$ +120.2° (C, 1 in MeOH). (Found: C, 64.1; H, 5.3: N, 4.8. C$_{24}$H$_{21}$NO$_7$ requires C, 63.9; H, 4.9; N,4.7 %).

EXAMPLE 2

The Two Epimers of α-Benzyloxycarbonylamino-p-hydroxybenzylpenicillin a. Ethyl chloroformate (6.3 ml.) was added dropwise at —5° to a vigorously stirred solution of (—)α-benzyloxycarbonylamino-p-hydroxyphenylacetic acid (20 g.) and 2,6-lutidine (8.3 ml.) in pure dry acetone (140 ml.). The mixture was held at —5°to +5° for 30 mins. to complete formation of the mixed ethoxyformic anhydride. An ice-cold solution of 6-aminopenicillanic acid (14.3 g.) and 2,6-lutidine (10.5ml.) in water (140 ml.) was added rapidly, and the mixture was stirred at 0° to 5° for 30 mins. and then for a further 1 hour while it attained room temperature. The solution was concentrated under reduced temperature and pressure to remove acetone, then the aqueous concentrate was covered with methyl isobutyl ketone (100 ml.) and adjusted to pH 2 by adding dilute hydrochloric acid. The layers were separated and the aqueous phase was extracted with more methyl isobutyl ketone (2 × 50 ml.). The combined organic extracts were washed with water, then shaken with sufficient aqueous sodium bicarbonate solution to give a neutral aqueous phase (pH 7). Separation of the layers and evaporation of the neutral aqueous solution at low temperature and pressure gave the solid sodium salt of 6-[(—)α-benzyloxycarbonylamino-p-hydroxy-phenylacetamido]-penicillanic acid (32 g., 92 percent).

b. Repetition of the above procedure except for the use of the (+) isomer of α-benzyloxycarbonylamino-p-hydroxyphenylacetic acid gave a 90 percent yield of the sodium salt of 6-[(+)α-benzyloxycarbonylamino-p-hydroxyphenylacetamido]penicillanic acid.

EXAMPLE 3

6-[(—)α-Amino-p-hydroxyphenylacetamido]Penicillanic Acid

A suspension of 5 percent palladium on calcium carbonate catalyst (40 g.) in water 150 ml.) was shaken in hydrogen for 1 hour. A solution of the sodium salt of 6-[(−)-α-benzyl-oxycarbonylamino-p-hydroxyphenylactamido]penicillanic acid (16g.) in water (50ml.) was added, and the mixture was shaken in hydrogen for 40 mins. The catalyst was filtered off through a pad of kieselguhr and washed with water (3 × 50 ml.). The combined filtrate and washings were adjusted to pH 1.9 and washed with methyl isobutyl ketone (3 × 50 ml.). The aqueous phase was adjusted to pH 5.1 and concentrated at low temperature and pressure to a volume of about 75 ml. The colorless crystalline solid which separated was collected, washed with a little water, then with acetone, and finally with ether. The resulting aminopenicillin, after drying in a vacuum desiccator, weighed 6.3 g. (56 percent yield) and analyzed as the trihydrate. (Found: C, 46.0; H, 6.5; N, 10.3; S, 7.4. $C_{16}H_{19}N_3O_5S$, $3H_2O$ requires C, 45.8; H, 6.0; N, 10.1; S, 7.6%). A sample stored in moist air took up water to form the tetrahydrate, $[\alpha]_D^{20}$ +246.5° (C, 0.1 in $H_2O$). (Found: C, 44.1; H, 6.1; N, 10.0; S, 7.6; $H_2O$, 16.3. $C_{16}H_{19}N_3O_5S$, $4H_2O$ requires C, 43.9; H, 6.2; N, 9.6; S, 7.4; $H_2O$, 16.4%).

EXAMPLE 4

6-[(+)α-Amino-p-hydroxyphenylacetamido]penicillanic Acid

The sodium salt of 6-[(+)α-benzyloxycarbonylamino-p-hydroxyphenylacetamido]penicillanic acid was hydrogenated in the same way and on the same scale as the epimer in Example 3. The crystalline product (6.1 g., 54 percent), after drying in a vacuum desiccator followed by equilibration in air, had $[\alpha]_D^{20}$ +154.6° (C, 0.1 in $H_2O$) and analyzed as the tetrahydrate. (Found: C, 43.7; H, 6.5; N, 9.3; S, 7.6; $H_2O$, 15.8. $C_{16}H_{19}N_3O_5S$, $4H_2O$ requires C, 43.9; H, 6.2; N, 9.6; S, 7.3; $H_2O$, 16.4%).

EXAMPLE 5

Resolution of α-Benzyloxycarbonylamino-m-hydroxyphenylacetic

The racemic m-hydroxy acid was resolved with quinidine in boiling ethanol (1.875 l. per mole), the quinidine salt of the (−) isomer crystallizing on cooling. The crystals were collected, boiled with ethanol (1.3 l. per mole), and the suspension was cooled and filtered. The free acid was liberated from the salt essentially as described in Example 1 for the p-hydroxy isomer. Recrystallization from chloroform or toluene gave a 79 percent yield of (−)α-benzyloxy-carbonylamino-m-hydroxyphenylacetic acid, $[\alpha]_D^{20}$ −110.8° (C, 1 in MeOH).

The ethanol filtrate and washings from the above crystallization of the quinidine salt were evaporated in vacuo and the residual syrup was induced to crystallize by trituration with ether. Recrystallization from isopropanol gave the quinidine salt of the (+) acid, from which the free acid was liberated in the usual way. Recrystallization from chloroform or toluene gave a 73 percent yield of (+)α-benzyloxycarbonylamino-m-hydroxyphenylacetic acid, $[\alpha]_D^{20}$ +110.5° (C, 1 in MeOH).

EXAMPLE 6

The Two Epimers of α-benzyloxycarbonylamino-m-hydroxybenzyl-penicillin

These were prepared exactly as described in Example 2 for the p-hydroxy isomers.

From (−)α-benzyloxycarbonylamino-m-hydroxyphenylacetic acid there was obtained a 90 percent yield of the sodium salt of 6-[(−)α-benzyloxycarbonylamino-m-hydroxyphenylacetamido]-penicillanic acid.

The sodium salt of 6-[(+)α-benzyloxycarbonylamino-m-hydroxyphenylacetamido]penicillanic acid was obtained in 90 percent yield from (+)α-benzyloxycarbonylamino-m-hydroxyphenylacetic acid.

EXAMPLE 7

6-[(−)α-Amino-m-hydroxyphenylacetamido]penicillanic Acid

The sodium salt of 6-[(−)α-benzyloxycarbonylamino-m-hydroxyphenylacetamido]penicillanic acid was submitted to the catalytic hydrogenation procedure described in Example 3. The aqueous solution of the reduced penicillin was finally adjusted to pH 5.5 and concentrated at low temperature and pressure to give a 50 percent yield of the hydrated aminopenicillin, $[\alpha]_D^{20}$ +239° (C, 0.2 in $H_2O$). Karl Fischer assay indicated that the crystals contained 15 percent of water.

EXAMPLE 8

6-[(+)α-Amino-m-hydroxyphenylacetamido]penicillanic Acid

This was prepared in 60 percent yield as described in Example 7, but starting from the sodium salt of 6[(+)α-benzyloxycarbonyl-amino-m-hydroxyphenylacetamido]penicillanic acid. The crystalline aminopenicillin contained 15 percent of water and had $[\alpha]_D^{20}$ +135° (C, 0.2 in $H_2O$).

EXAMPLE 9

6-[(−)α-Amino-α-(p-hydroxyphenyl)acetamido]penicillanic Acid a. A suspension of (−)-α-benzyloxycarbonylamino-α-(p-hydroxyphenyl)acetic acid (21.8g.) in water (180 ml.) was treated with dilute sodium hydroxide solution to give a clear solution of pH 8.7. 5 percent Palladium on calcium carbonate catalyst (2.2 g.) was added, and the mixture was shaken in hydrogen at atmospheric pressure until no more gas was absorbed. The catalyst was filtered off through a pad of kieselguhr and washed with water. The combined filtrate and washings were adjusted to pH 5.0 and the solution was evaporated in vacuo to small bulk. The crude product separated as a gelatinous precipitate which redissolved when the mixture was boiled. Colorless, crystalline (−)-α-amino-α-(p-hydroxyphenyl)acetic acid separated when the solution was cooled. It was collected, washed with a little cold water, and dried in vacuo over phosphorus pentoxide. The yield was 10.1 g. (83 percent), m.p. 225° −226°, $[\alpha]_D^{20}$ −108° (c, 1 in $H_2O$). (Found: C, 57.2; H, 5.4; N, 8.3%. $C_8H_9NO_3$ requires: C, 57.5; H, 5.4; N, 8.4%). N.M.R. ($D_2O$ + NaOD): multiplet centered on τ3.15 (4H, aromatic), singlet τ5.8

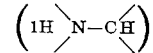

b. Methanolic sodium hydroxide (60 ml. 0.324N, 0.0195 mole) was added to (−)-α-amino-α-(p-hydroxyphenyl)acetic acid (3.34 g. 0.02 mole) and washed in with methanol (20 ml.). When the suspension was heated almost to boiling a clear solution was obtained, but at reflux the crystalline sodium salt of the amino-acid separated. To the stirred, boiling suspension was added during 10 minutes methyl acetoacetate (2.4 ml., 0.022 mole) in methanol (20 ml.). After a further 20 minutes of boiling a clear solution resulted and this was boiled for 20 minutes longer. The methanol was distilled off (bath temperature 130°) and replaced simultaneously at the same rate with dry toluene. When 90 ml. of toluene had been added a white crystalline solid separated. The process was continued until the distillation temperature reached 100° and 170 ml. of toluene had been added. The suspension was kept overnight at 5°, then the product was collected, washed with dry toluene, and dried in vacuo at 40° over phosphorus pentoxide. The yield of sodium (−)-N-(1-methoxycarbonylpropen-2-yl)-α-amino-α-(p-hydroxyphenyl)acetate was 4.5 g. (95%) Found: C, 54.35; H, 4.9; N, 4.9% $C_{13}H_{14}NO_5$ Na requires C, 54.4; H, 4.9; H, 4.9%). I.R. (Nujol): 3,300cm$^{-1}$ (N—H—), 1655cm$^{-1}$ (C = O—), 1560cm$^{-1}$ (COO$^-$).

c. A stirred suspension of 6-aminopenicillanic acid (2.16g., 0.01 mole) in water (25 ml.) was adjusted to pH 7.8 by the addition of aqueous 10% sodium hydroxide, care being taken that the pH did not rise above 8.0 during the addition. Acetone (40 ml.) was added, and the solution was cooled to −10°.

Dry acetone (25 ml.) was stirred and held at −10° to −8° while ethyl chloroformate (1.0 ml., 0.0104 mole) was added, followed by 1 percent N-methylmorpholine in acetone (1.5 ml.), and finally the sodium (−)-N-(-1-methoxycarbonyl-propen-2-yl)-α-amino-α-(p-hydroxyphenyl)acetate (2.87 g., 0.01 mole) which was washed in with cold, dry acetone (15 ml.). The mixture was stirred at −10° for 30 minutes, then it was added to the solution of sodium 6-aminopenicillanate described above, and washed in with cold dry acetone (20 ml.). The mixture was stirred for 20 minutes at −10°, then the acetone was distilled off in vacuo at room temperature and isobutyl methyl ketone (40 ml.) was added to the residual aqueous solution. The mixture was cooled to 5°, stirred vigorously, and adjusted to pH 0.9 by the addition of concentrated hydrochloric acid. The mixture was maintained at pH 0.9 and 5°–10° during 75 minutes, then the layers were separated. The aqueous layer was washed with isobutyl methyl ketone (10 ml.) then the residual solvent was removed in vacuo. The aqueous solution was cooled to 5° and adjusted to pH 5.2 with aqueous 10 percent sodium hydroxide. The resulting suspension was stirred at 5° for 5 minutes, then it was concentrated in vacuo at 20° to one third of its bulk. The white crystalline 6-[(−)-α-amino-α-(p-hydroxyphenyl)-acetamido] penicillanic acid was collected, washed with water (20 ml.) and dried in air at 40°. The product (2.8 g.) was shown by i.r. and n.m.r. spectroscopy and by paper strip chromatography to be identical with that obtained as in Example 3.

The intermediate described in (b) above can also be made as follows:

d. A stirred suspension of 6-aminopenicillanic acid (4.32 g., 0.02 mole) in water (50 ml.) was adjusted to pH 7.8 by careful addition of 10 percent potassium hydroxide solution. Acetone (80 ml.) was added and the solution cooled to −10°C.

Dry acetone (50 ml.) was stirred and held at −10 to −8° C while ethyl chloroformate (2.0 ml. 0.0208 mole) was added, followed by 1 percent N-methylmorpholine in acetone (3 ml.) and finally sodium (−)N-(1-methoxycarbonylpropen-2-yl)α-amino-α-(p-hydroxyphenyl)acetate (5.74 g., 0.02 mole), which was washed in with cold dry acetone (30 ml.). The mixture was stirred at −10° for 30 min. to complete formation of the mixed anhydride in solution, then cooled to −25° and filtered rapidly through acid-washed kieselguhr. The filter pad was washed with cold dry acetone (20 ml.) and the combined filtrate and washings were added to the cold stirred aqueous acetone solution of potassium 6-aminopenicillanate described above.

The clear solution was stirred without external cooling for 30 min. and then evaporated to dryness at reduced pressure and at temperature below 20°. The residual gum was dried in vacuo over phosphorus pentoxide. The crude product weighed 9.7 g. The greater part (9.5 g.) was treated with dry methanol (70 ml.) in which it largely dissolved, but a little 6-aminopenicillanic acid (0.54 g.) was removed by filtration. The yellow filtrate was stirred for 5 min. with charcoal (2.3 g.) and then the mixture was again filtered. The filtrate was diluted with dry isopropanol (250 ml.), crystallization was induced by scratching, and the mixture was set aside at 5° overnight. The resulting white solid was collected by filtration, washed with dry ether, and dried in vacuo over phosphorus pentoxide to give 3.5 g. of potassium 6-[(−)-N-(1-methoxycarbonylpropen-2-yl)α-amino-α-(p-hydroxyphenyl)acetamido]penicillanate hemihydrate. (Found: C, 49.25; H, 5.2; N, 8.3; S, 6.35 ; K. 7.6. C$_{21}$H$_{24}$N$_3$O$_7$SK, 0.5 H$_2$O requires C, 49.4; H, 4.9; N, 8.25; S, 6.25; K, 7.65%).

An aqueous solution of this salt acidified to pH 2 rapidly liberated methyl acetoacetate and 6-[(−)α-amino-α-(p-hydroxyphenyl)acetamido]penicillanic acid.

EXAMPLE 10

Finely ground 6-[(−)-α-amino-p-hydroxyphenylacetamido]penicillanic acid trihydrate (2 g.) was suspended in water (5ml) and to it was added 5N hydrochloric acid (2.5 ml.). The mixture was shaken until most of the solid dissolved and rapidly filtered. The filtrate was seeded and allowed to stand at 5° for 30 minutes when hexagonal shape crystals came out of solution. The crystals were filtered off, washed with a little cold water and dried in an oven at 35°–40° C. to give 6-[(−)-α-amino-p-hydroxyphenylacetamido]penicillanic acid hydrochloride trihydrate. (1.6g.), m.p. browns 90° then dehydrates. decomp. 216°–218° C. Hydroxylamine assay 100% Mol. Wt. 496.0 H$_2$O content 11.9%. (Found: C, 42.1; H, 5.7; N,9.1; S, 7.2; Cl, 7.9; calculated for C$_{16}$H$_{20}$N$_3$O$_5$S Cl. 3H$_2$O. C, 42.2; H, 5.7, N, 9.2; S, 7.0 Cl, 7.8%).

EXAMPLE 11

Finely ground 6-[(−)-α-amino-p-hydroxyphenylacetamido]-penicillanic acid trihydrate [2g.] was suspended in water (200 ml.) and to it added 5N sulphuric acid (2.5 ml.) and the mixture stirred at room temperature for five minutes. The mixture was filtered and evaporated to low volume (ca 50 ml.) at low temperature and low pressure. The white solid which crystallized out of solution was filtered off, washed with a little cold water and dried in an oven at 35°–40° to give di(6-[(−)-α-amino-p-hydroxyphenylacetamido]penicillanic acid) sulphate (1.2g.) m.p. browns 210° C., decomp. 230°–1° C. Hydroxylamine assay 227%, H$_2$O content 1.1%, (Found: C, 46.1%; H, 4.9; N, 10.1; S, 11.8; calculated for C$_{32}$H$_{40}$N$_6$S$_3$O$_{14}$ C, 46.4; H, 4.9; N, 10.1; S, 11.6%).

EXAMPLE 12

(−)-α-Benzyloxycarbonamido-α-(p-benzyloxycarbonyloxyphenyl) Acetic Acid a. To a vigorously stirred ice-cold solution of (−)-α-benzyloxycarbonamido-α-(p-hydroxyphenyl)acetic acid (15 g.) and sodium hydroxide (7 g.) in water (1,500 ml.) was added benzyl chloroformate (13 g.). After stirring for 2 hours the solution was extracted with ether and a small amount of precipitated solid filtered off and discarded. A stream of air was bubbled through the separated aqueous phase to remove dissolved ether. On addition of the solution to excess hydrochloric acid a gum was precipitated. The supernatant liquid was decanted off and benzene (200 ml.) added to the residual wet gum. On refluxing, the gum dissolved and azeotroped water was removed (Dean and Stark apparatus). On cooling the benzene solution (−)-α-benzyloxycarbonamido- α-(p- benzyl-oxycarbonyloxyphenyl)acetic acid was obtained as a white crystalline solid (14 g.) m.p. 94°–5°. Analysis showed the compound to contain a molecule of benzene of crystallization. Found: C, 69.8; H, 5.3; N, 2.8%. C$_{24}$H$_{21}$NO$_7$· C$_6$H$_6$ requires C, 70.2; H, 5.3; N, 2.7%. ppm CDCl$_3$: 10.34 (s, 1H, NH); 7.25 (m, Ar, 20H); 5.35 (s, 1H, CH); 5.25 (s, 2H, CH$_2$) and 5.05 (s, 2H, CH$_2$).

(−)-N-Carboxy-(p-benzyloxycarbonyloxyphenyl)glycyl anhydride b. The benzene solvate of D-α-benzyloxycarbonamido-α-(p-benzyloxycarbonyloxyphenyl)acetic acid (4.35 g.) was covered with thionyl chloride and the solution refluxed for 2 hours. The excess thionyl chloride was removed under reduced pressure, last traces being removed by codistillation with dry benzene under reduced pressure and then storage in vacuo for 30 min. Dry ether (15 ml.) was then added to the gummy residue to give a clear solution which on standing for 5–10 min. precipitated (−)-N-carboxy-(p-benzyloxycarbonyloxyphenyl) glycyl anhydride as a white crystalline solid (1.33 g.) m.p. 118°–120°. Found: C, 62.3; H, 4.1; N, 4.3%. C$_{17}$H$_{13}$NO$_6$ requires C, 62.4; H, 4.0; N, 4.3%.

6-[(−)-α-Amino-α-(p-benzyloxycarbonyloxyphenyl)acetamido]-penicillanic Acid c. A suspension of 6-aminopenicillanic acid (0.66 g.) in water (100 ml.) was adjusted to pH 5.5 and to the vigorously stirred suspension at 5° was added, in portions, over 5 minutes, (−)-N-carboxy-(p-benzyloxycarbonyloxyphenyl)glycyl anhydride (0.99 g.). The pH remained at 5.5 during the addition.

Vigorous stirring was continued for 2 hours at 5°–10°. The mixture was filtered through kieselguhr and the filtrate concentrated to 25 ml. 6-[(−)-α-amino-α-(p-benzyloxycarbonyloxyphenyl)-acetamido]penicillanic acid (0.09 g.) was precipitated as a white solid. Paper chromatography indicated that the product was contaminated with approximately 5 percent of 6-aminopenicillanic acid. In the system butanol/ethanol/water:

6-[(−)-α-amino-α-(p-benzyloxycarbonyloxyphenyl)-acetamido]penicillanic acid $R_f$ 0.47; 6-aminopenicillanic acid $R_f$ 0.13. The product inhibited E. coli 2 at a concentration of 5 μg./ml. and Staph. Oxford at 0.1 μg./ml.

Hydrolysis of the O-Benzyloxycarbonyl Group d. The above penicillin was dissolved in phosphate buffer at pH 9 and held at this pH, portions being withdrawn at intervals and examined by paper chromatography. After 3 days at room temperature conversion to 6-[(−)-α-amino-α-(p-hydroxyphenyl)acetamido]penicillanic acid was virtually complete.

EXAMPLE 13

(−)-N-Carboxy-(p-hydroxyphenyl)glycyl Anhydride a. Phosgene gas was passed through a suspension of (−)-α-amino-α-(p-hydroxyphenyl)acetic acid (4 g.) in dioxan (150 ml.) at 50°–60° until a clear solution was obtained. Excess phosgene was flushed out with nitrogen and the solution filtered. Dioxan was removed from the filtrate at 50° under reduced pressure to leave an oil which solidified on storage in vacuo over phosphorus pentoxide. The solid dissolved in boiling ether acetate (50 ml.) to leave a small amount of gummy solid. Charcoal was added and the mixture stirred whilst allowing it to cool to room temperature. After filtering through kieselguhr the filtrate was added slowly to stirred 40°–60° petroleum ether (400 ml.) to precipitate (−)-N-carboxy-(p-hydroxyphenyl)glycyl anhydride as a white crystalline solid (3.1 g. m.p. 260° decomp.). Found: C, 56.1; H, 3.7; N, 7.1%. $C_9H_7NO_4$ requires: C, 56.0; H, 3.65; N, 7.25%.

6-[(−)-α-Amino-α-(p-hydroxyphenyl)acetamido]penicillanic Acid b. A suspension of 6-aminopenicillanic acid (1.5 g.) in water (100 ml.) was adjusted to pH 5.6 by the addition of sodium hydroxide solution. To the stirred suspension at 5° was added (−)-N-carboxy-(p-hydroxyphenyl)glycyl anhydride (1.5g.) in portions over 5 min. The mixture was stirred at 5°–10 for 1 hour and for a further hour at room temperature. A considerable amount of foaming took place which was controlled by the addition of one to two drops of n-octyl alcohol. The mixture was then filtered through kieselguhr and the pH of the filtrate adjusted to 5.0. No solid was precipitated on concentration and therefore the solution was evaporated to dryness to yield an off-white solid (1.7 g.). Paper chromatography indicated that the product contained 6-aminopenicillanic acid and the required 6-[(−)-α-amino-α-(p-hydroxyphenyl)acetamido]penicillanic acid in approximately equal proportions.

EXAMPLE 14

Reaction of 6-Aminopenicillanic Acid With (−)-α-Amino-α-(p-hydroxyphenyl)acetyl Chloride Hydrochloride (−)α-Amino-α-(p-hydroxyphenyl)acetic acid (1.67 g.) was suspended in acetyl chloride (50 ml.) and cooled to 0° while finely powdered phosphorus pentachloride (4.16 g.) was added with stirring. Dimethylformamide (2 drops) was added and dry hydrogen chloride was bubbled through the ice-cold mixture for 90 min., followed by dry nitrogen for 1 hour. During passage of the gases a gum separated and then crystallized. The yellow granular solid was collected, washed well with dry ether, and stored in vacuo over phosphorus pentoxide since it readily decomposed on exposure to moist air. This product (1.27 g.), considered to be the acid chloride hydrochloride, shows characteristic carbonyl absorption in the infra-red (1780cm$^{-1}$).

6-Aminopenicillanic acid (0.63 g.) in water (20 ml.) was adjusted to pH 6.2 and acetone (80 ml.) was added. The solution was cooled to 0° and the previously described solid acid chloride hydrochloride (1.27 g.) was added in portions during 10 min. When about half the reagent had been added the pH had dropped to 2, and during addition of the remainder it was held at this value by adding 10 percent sodium hydroxide solution as required.

The mixture was stirred at 0° for 10 min., then concentrated under reduced pressure to remove acetone and clarified by filtration through kieselguhr. The filtrate was washed with methyl isobutyl ketone (2 × 25 ml.) and the aqueous solution was concentrated at low temperature and pressure to a volume of about 20 ml. After further clarification by filtration through kieselguhr, the solution was adjusted to pH 5 and evaporated to dryness in vacuo. The residual white solid (1.6 g.) was shown by paper chromatography to contain 6-[(−)-α-amino-α-(p-hydroxyphenyl)acetamido]penicillanic acid.

EXAMPLE 15

β-Naphthalenesulphonate Salt of 6-[(−)-α-Amino-α-(p-hydroxy-phenyl)acetamido]penicillanic Acid 6-[(−)-α-Amino-α-(p-hydroxyphenyl)acetamido]penicillanic acid trihydrate (2.09 h., 0.005 mole) was stirred with water (20 ml. and ethanol (10 ml.). The mixture was treated with a 1 M aqueous solution of naphthalene-β-sulphonic acid (5 ml., 0.005 mole) to give a clear solution which crystallized on standing. After 1 hour the crystals were collected, washed with ice-cold water, and dried in air at 30°. The product (0.82 g.) had m.p. 194° (decomp.) and analyzed as the β-naphthalenesulphonate trihydrate. Found: C, 49.5; H, 5.4; N, 6.6; S, 10.0. $C_{26}H_{27}N_3S_2O_8$, $3H_2O$ requires: C, 49.7; H, 5.3; N, 6.7; S, 10.2%.

EXAMPLE 16

Sodium 6-[(−)α-Amino-α-(p-hydroxyphenyl)acetamido] penicillanate

Finely powdered 6-[(−)α-amino-α-(p-hydroxyphenyl)-acetamido]penicillanic acid trihydrate (8.40 g., 0.02 mole) was suspended in methylene dichloride (250ml.), treated with diethylamine (1.75 g.), and stirred for 15 min. Complete dissolution was brought about by adding methanol (25 ml.), and the solution was dehydrated by stirring with 5 g. of Linde type 4A Molecular Sieve for 30 min. The suspension was filtered and the filtrate treated with a 1M. solution of sodium 2-ethylhexanoate in methyl isobutyl ketone (20 ml.). The sodium salt separated as a white solid which was collected at 15 min., washed with methylene dichloride, and dried in vacuo. Yield 77 percent. Found: C, 49.6; H, 5.2; N, 10.3; S, 8.0; Na, 5.5. $C_{16}H_{18}N_2O_5SNa$ requires: C, 49.6; H, 4.7; N, 10.8; S, 8.3; Na, 5.9%.

EXAMPLE 17

Synergistic Combinations of 6-[(−)-α-Amino-α-(p-hydroxyphenyl)-acetamido]-penicillanic Acid With Penicillinase-Resistant Penicillins Certain strains of Gram-negative bacteria which are relatively insensitive to 6-[(−)α-amino-α-(p-hydroxyphenyl-acetamido]penicillanic acid alone are inhibited by quite low concentrations of this antibiotic in the presence of 100 μg./ml. of various penicillinase-resistant penicillins, such as methicillin, cloxacillin, dicloxacillin, flucloxacillin, and nafcillin. None of these penicillinase-resistant penicillins by itself inhibits the Gram-negative bacteria at 100 μg./ml.

Results were obtained by serial dilution in nutrient agar. The inoculum was one drop of an overnight broth culture, and M.I.C. values were read after 18 hours at 37° C.

Minimum inhibitory concentration (μg./ml.) of AB.2333 in presence of 100 μg./ml. of the following:

| Bacterium | none | methicillin | cloxacillin | dicloxacillin | flucloxacillin | nafcillin |
|---|---|---|---|---|---|---|

| | | | | | | |
|---|---|---|---|---|---|---|
| E.coli 37 | 125 | 1.25 | 1.25 | 1.25 | 1.25 | 2.5 |
| Proteus morganii G | 250 | 1.25 | 12.5 | 5.0 | 5.0 | 125 |
| Proteus vulgaris K | 250 | 50 | 12.5 | 2.5 | 5.0 | 125 |
| Paracolon 232 | 125 | 2.5 | 1.25 | 1.25 | 1.25 | 12.5 |
| Klebsiella C 978 | 250 | 50 | 50 | 50 | 25 | 50 |

We claim:

1. A compound selected from the group consisting of 6-[(−)-α-amino-p-hydroxyphenylacetamido]-penicillanic acid and the non-toxic, pharmaceutically acceptable acid addition and base addition salts thereof and salts with non-toxic amines.

2. A compound or salt according to claim 1 which is amorphous or crystalline in form.

3. A compound or salt according to claim 1 which is anhydrous or hydrated.

4. A compound or salt according to claim 1 which is free of traces of high molecular weight allergenic impurities.

5. A compound or salt according to claim 1, wherein the salt is selected from the group consisting of the hydrochloric, phosphoric, sulfuric, thiocyanic and β-naphthalene sulfonic acids and the sodium and potassium alkali metal salts.

* * * * *